United States Patent
Kawabe et al.

(10) Patent No.: US 7,590,041 B2
(45) Date of Patent: Sep. 15, 2009

(54) PLAYBACK SIGNAL PROCESSING DEVICE (75) Inventors: Akira Kawabe, Osaka (JP); Akira Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 463 days.

(21) Appl. No.: 11/659,238

(22) PCT Filed: Apr. 18, 2005

(86) PCT No.: PCT/JP2005/007385

§ 371 (c)(1),
(2), (4) Date: Feb. 2, 2007

(87) PCT Pub. No.: WO2006/013660

PCT Pub. Date: Feb. 9, 2006

(65) Prior Publication Data

US 2008/0037393 A1 Feb. 14, 2008

(30) Foreign Application Priority Data

Aug. 3, 2004 (JP) ............................. 2004-226307

(51) Int. Cl.
*G11B 20/10* (2006.01)
(52) U.S. Cl. ............... 369/59.19; 369/47.35; 369/59.21
(58) Field of Classification Search ................. None
See application file for complete search history.

(56) References Cited

U.S. PATENT DOCUMENTS 5,321,723 A * 6/1994 Mizoguchi .................. 375/233
6,160,673 A * 12/2000 Izumi et al. .................... 360/46
6,674,707 B2 1/2004 Ogura et al.
6,747,924 B1 6/2004 Muramatsu
2003/0028820 A1 2/2003 Takashi et al.

(Continued)

FOREIGN PATENT DOCUMENTS

JP          9-245436 A          9/1997

(Continued)

OTHER PUBLICATIONS

F.M. Gardner, "Interpolation in Digital Modems—Part I: Fundamentals", IEEE Transactions on Communications. Mar. 1993, 501-507. vol. 41. No. 3.

(Continued)

*Primary Examiner*—Paul Huber
(74) *Attorney, Agent, or Firm*—McDermott Will & Emery LLP (57) ABSTRACT

In a playback signal processing device for extracting, from an analog playback signal, playback data and a clock synchronized with the playback data, a digital equalizer 2 is disposed outside a clock extraction loop formed by an interpolator 3, a timing recovery circuit 4, and a control circuit 5. The digital equalizer 2 is provided between an A/D converter 1 and the interpolator 3 and performs equalization processing on digital playback data from the A/D converter 1 in accordance with the timing of a fixed clock CLK from a synthesizer 7. The coefficients of the digital equalizer 2 are updated by the control circuit 5 by using a coefficient setting device 6 according to frequency ratio information 4a from the timing recovery circuit 4. Accordingly, the clock extraction capability is enhanced in spite of the equalization processing on the playback signal by the digital equalizer.

13 Claims, 5 Drawing Sheets

U.S. PATENT DOCUMENTS

2004/0114912 A1    6/2004  Okamoto

FOREIGN PATENT DOCUMENTS

| JP | 2000-48490 A | 2/2000 |
| JP | 2000-298835 A | 10/2000 |
| JP | 2001-126261 A | 5/2001 |
| JP | 2001-195830 A | 7/2001 |
| JP | 2004-199727 A | 7/2004 |

OTHER PUBLICATIONS

L. Erup, "Interpolation in Digital Modems—Part II: Implementation and Performance", IEEE Transactions on Communications, Jun. 1993, 998-1008, vol. 41, No. 6.

* cited by examiner

PLAYBACK SIGNAL PROCESSING DEVICE

RELATED APPLICATIONS

This application is the U.S. National Phase under 35 U.S.C. § 371 of International Application No. PCT/JP2005/007385, filed on Apr. 18, 2005, which in turn claims the benefit of Japanese Application No. 2004-226307, filed on Aug. 3, 2004, the disclosures of which Applications are incorporated by reference herein.

TECHNICAL FIELD

The present invention relates to a playback signal processing device for extracting, from a recording medium, such as an optical disk or magnetic disk, data recorded in the recording medium and a synchronous clock that is synchronized with the data. More particularly, the present invention relates to equalizer techniques for performing waveform equalization.

BACKGROUND ART

A conventional playback signal processing device in an optical disk device or the like is described in Patent Document 1. An example of this type of conventional playback signal processing device is shown in FIG. 5.

Figure 5:
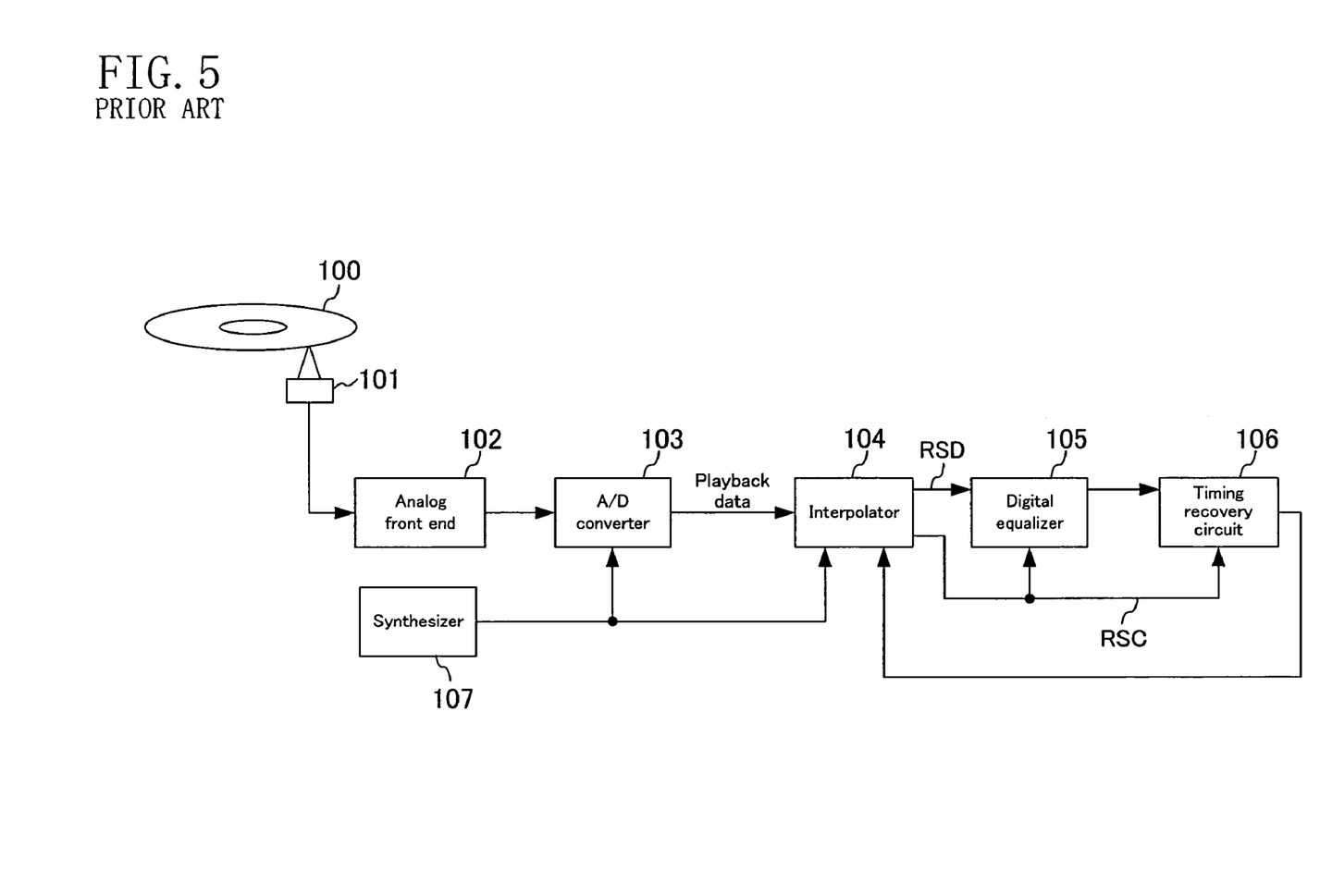
FIG. 5 is a view illustrating an exemplary structure of a conventional playback signal processing device for playing back a signal from an optical disk.

In FIG. 5, 100 refers to a recording medium such as an optical disk; 101 to an optical pickup; 102 to an analog front end; 103 to an A/D converter; 104 to an interpolator; 105 to a digital equalizer; 106 to a timing recovery circuit; 107 to a synthesizer; RSD to resampled data; and RSC to a resampled clock.

To play back data written in the recording medium 100, the recording medium 100 is first irradiated with laser light, and the optical pickup 101 captures the reflected light to convert differences in the intensity of the reflected light into an electric signal, thereby generating an analog playback signal. The analog playback signal obtained by the optical pickup 101 is then subjected, in the analog front end 102, to signal amplitude gain adjustment and DC offset adjustment, and then to waveform equalization and noise removal processing.

The analog playback signal subjected to the waveform equalization processing in the analog front end 102 is quantized by the A/D converter 103 in accordance with a fixed clock output from the synthesizer 107 and thereby becomes playback data having a digital value. In the subsequent stages, digital signal processing is performed. Based on frequency ratio information output from the timing recovery circuit 106, the interpolator 104 generates the resampled data RSD and the resampled clock RSC from the playback data quantized by the A/D converter 103 and outputs the resampled data RSD and the resampled clock RSC. The digital equalizer 105 receives the resampled data RSD and the resampled clock RSC from the interpolator 104 and performs waveform correction processing on the resampled data RSD and the resampled clock RSC. The timing recovery circuit 106 receives, from the digital equalizer 105, the resampled data RSD and the resampled clock RSC subjected to the waveform correction processing, and performs clock extraction from the resampled data RSD and the resampled clock RSC to output the frequency ratio information on the ratio between a channel clock frequency contained in the analog playback signal and the resampled clock frequency.

Patent Document 1: Japanese Laid-Open Publication No. 2000-48490 (FIG. 1)

DISCLOSURE OF THE INVENTION

Problem that the Invention Intends to Solve

In the playback signal processing device for playing back a signal from an optical disk or the like, the timing recovery circuit 106 is required, by its nature, to perform high-speed clock extraction operation.

However, in the conventional playback signal processing device shown in FIG. 5, the digital equalizer 105 is disposed in the clock extraction loop (from the interpolator 104 to the timing recovery circuit 106) for performing the clock extraction, and the digital equalizer 105 performs the waveform equalization using the resampled data RSD and the resampled clock RSC from the interpolator 104. This causes a delay in time, equal in length to clock latency in the digital equalizer 105, between the generation of the frequency ratio information by the timing recovery circuit 106 and the use thereof in the interpolator 104. With consideration given to the fact that the number of pipeline stages is increased further when operation is performed at very high speed, it is found that this causes a problem in that the clock extraction capability deteriorates due to increase in clock latency.

In view of the above problem, the present invention was made, and it is therefore an object of the present invention to enable, in the playback signal processing device for playing back a signal from an optical disk or the like, the timing recovery circuit 106 to perform high-speed clock extraction operation in spite of the waveform equalization processing by the digital equalizer 105, so as to increase the clock extraction capability.

Means for Solving the Problem

In order to solve the problem, according to the present invention, a digital equalizer that would cause increase in latency is disposed outside a clock extraction loop, so that the digital equalizer operates in accordance with a fixed clock that is different from a clock contained in an analog playback signal.

Specifically, an inventive playback signal processing device for receiving an analog playback signal and extracting, from the analog playback signal, binary digital data and a clock which is synchronized with the digital data includes: a synthesizer for outputting a fixed clock of a predetermined frequency; an A/D converter for receiving the analog playback signal and the fixed clock from the synthesizer, quantizing the analog playback signal in accordance with the timing of the fixed clock, and outputting digital playback data; a digital equalizer for receiving the playback data from the A/D converter and a plurality of coefficients and equalizing the playback data according to the plurality of coefficients in accordance with the timing of the fixed clock from the synthesizer; an interpolator for receiving the playback data equalized by the digital equalizer and a resample control signal and obtaining, from the equalized playback data, resampled data and a resampled clock that correspond to clock information contained in the equalized playback data; a timing recovery circuit for outputting frequency ratio information on a ratio between a frequency indicated by clock information contained in the analog playback signal and the frequency of the fixed clock output from the synthesizer, according to the resampled data and the resampled clock from the interpolator; a control circuit for receiving the frequency ratio information from the timing recovery circuit and an external signal, generating the resample control signal based on the received frequency ratio information and external signal to output the resample control signal to the interpolator, and generating a coefficient setting control signal based on the received frequency ratio information and external signal to output the coefficient setting control signal; and a coefficient setting device for receiving the coefficient setting control signal from the control circuit, generating the plurality of coefficients based on the coefficient setting control signal, and outputting the plurality of coefficients to the digital equalizer.

In the inventive playback signal processing device, the digital equalizer includes a plurality of delay circuits, a plurality of multipliers, and an adder.

In the inventive playback signal processing device, of the plurality of delay circuits and the plurality of multipliers included in the digital equalizer, the number of delay circuits to be used and the number of multipliers to be used are variable as desired.

In the inventive playback signal processing device, in the digital equalizer, the number of delay circuits to be used and the number of multipliers to be used are varied according to the frequency ratio information from the timing recovery circuit.

In the inventive playback signal processing device, the fixed clock output from the synthesizer has a frequency higher than the frequency indicated by the clock information contained in the analog playback signal.

In the inventive playback signal processing device, the coefficient setting device beforehand has a plurality of sets of coefficients for the digital equalizer, selects the coefficients in one of the sets that corresponds to the coefficient setting control signal from the control circuit, and outputs the selected coefficients to the digital equalizer.

In the inventive playback signal processing device, in the coefficient setting device, coefficients for shaping the waveform of the playback data from the A/D converter are set beforehand, and the coefficient setting device selects a required number of multipliers from among the included multipliers in accordance with the coefficient setting control signal from the control circuit and calculates and outputs a plurality of coefficients for the selected multipliers.

In the inventive playback signal processing device, the analog playback signal is a signal played back from a recording medium such as an optical disk.

In the inventive playback signal processing device, the external signal input to the control circuit is information on whether data being played back from the recording medium is located at the inner or outer rim of the recording medium.

In the inventive playback signal processing device, the external signal input to the control circuit is information on a speed at which the recording medium is played back.

In the inventive playback signal processing device, the external signal input to the control circuit is a type-determination signal that determines the type of the recording medium.

In the inventive playback signal processing device, the external signal input to the control circuit is a failure detection signal which indicates detection of a failure in the analog playback signal.

In the inventive playback signal processing device, the control circuit retains the value of the resample control signal output to the interpolator and the value of the coefficient setting control signal output to the coefficient setting device in a stable state, and when the failure detection signal is input as the external signal, the control circuit temporarily resets those control signals, and when the input of the failure detection signal is stopped, the control circuit outputs again the resample control signal and the coefficient setting control signal having the retained values.

As described above, in the playback signal processing device according to the present invention, the digital equalizer that would cause increase in latency is disposed outside the clock extraction loop, such that the resampled data and the resampled clock from the interpolator are directly input into the timing recovery circuit. Therefore, unlike in the conventional playback signal processing device, a delay, which is equal in length to clock latency in the digital equalizer, does not occur. This permits the response speed of the timing recovery circuit to be increased further by the length of time corresponding to such a delay that would otherwise occur. Consequently, the frequency ratio information from the timing recovery circuit is reflected faster in the interpolator, thereby increasing the clock extraction capability.

In particular, according to the present invention, although the digital equalizer operates in accordance with the fixed clock output from the synthesizer, the coefficients of the digital equalizer are updated according to the frequency ratio information from the timing recovery circuit, which enables efficient waveform equalization.

Effects of the Invention

As described above, in the inventive playback signal processing device, the digital equalizer is disposed outside the clock extraction loop and is operated in accordance with the fixed clock that is different from the clock contained in the analog playback signal. This permits the response speed of the timing recovery circuit to be enhanced further, thereby increasing the clock extraction capability.

In particular, according to the present invention, the coefficients of the digital equalizer are updated in accordance with the frequency ratio information from the timing recovery circuit, thereby enabling efficient waveform equalization.

EXPLANATION OF THE REFERENCE CHARACTERS

1 A/D converter
2 Digital equalizer
3 Interpolator
4 Timing recovery circuit
5 Control circuit
6 Coefficient setting device
7 Synthesizer
CLK Fixed clock
RSD Resampled data
RSC Resampled clock
100 Recording medium
101 Optical pickup
102 Analog front end
201$a$ to 201$l$ Flip-flop circuits (delay circuits)

202a to 202k Multipliers
203 Adder
Sa to Sk Tap coefficients

BEST MODE FOR CARRYING OUT THE INVENTION

Hereinafter, embodiments of a playback signal processing device according to the present invention will be described with reference to the accompanying drawings.

FIRST EMBODIMENT

Figure 1:
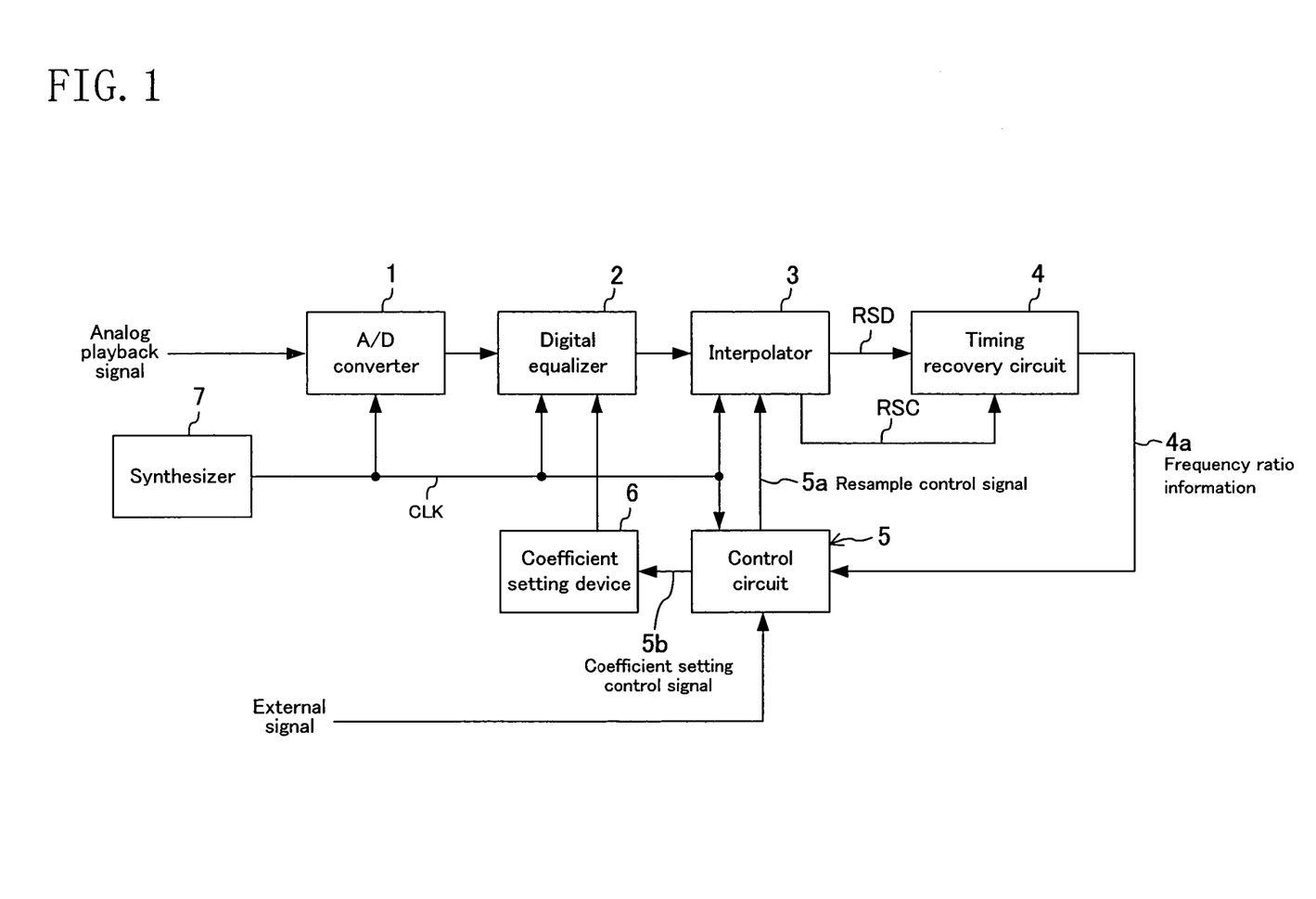
FIG. 1 is a view illustrating the structure of a playback signal processing device according to a first embodiment of the present invention.

FIG. 1 illustrates the structure of a playback signal processing device according to a first embodiment of the present invention.

In FIG. 1, the reference numeral 1 refers to an A/D converter, and the reference numeral 7 refers to a synthesizer for generating and outputting a clock of a predetermined frequency (which will be hereinafter refereed to as a "fixed clock") CLK. The A/D converter 1 receives an analog playback signal and the fixed clock CLK from the synthesizer 7 and quantizes the analog playback signal at a given timing, such as at the rise or fall of the fixed clock CLK, to output digital playback data. Although not shown in FIG. 1, the analog playback signal is a playback signal obtained and output by the analog front end 102 shown in FIG. 5 by performing noise removal processing and the like on an analog playback signal from the recording medium 100 such as an optical disk. The frequency of the fixed clock CLK generated by the synthesizer 7 is beforehand set higher than a frequency indicated by clock information contained in the analog playback signal.

Also, in FIG. 1, the reference numeral 2 refers to a digital equalizer for performing waveform equalization; 3 to an interpolator; 4 to a timing recovery circuit; and 5 to a control circuit. The interpolator 3 receives, from the digital equalizer 2, playback data (which will be discussed later) subjected to waveform equalization processing, calculates, from the playback data, resampled data RSD and a resampled clock RSC corresponding to clock information contained in the playback data, according to frequency ratio information 4a output from the timing recovery circuit 4 (specifically, a resample control signal 5a from the control circuit 5 as will be described later), and outputs the resampled data RSD and the resampled clock RSC. Based on the resampled data RSD and the resampled clock RSC from the interpolator 3, the timing recovery circuit 4 calculates the frequency ratio information 4a on the ratio between a channel clock frequency contained in the analog playback signal and the frequency of the fixed clock CLK from the synthesizer 7. The control circuit 5 receives the frequency ratio information 4a from the timing recovery circuit 4, an externally provided external signal containing given contents, and the fixed clock CLK from the synthesizer 7, generates the resample control signal 5a based on the frequency ratio information 4a and the external signal, and outputs the resample control signal 5a to the interpolator 3.

The interpolator 3, the timing recovery circuit 4, and the control circuit 5 form a clock extraction loop. The interpolator 3 has a typical structure, the details of which are described in IEEE TRANSACTIONS ON COMMUNICATIONS, VOL. 41, NO. 3, MARCH 1993 and IEEE TRANSACTIONS ON COMMUNICATIONS, VOL. 41, NO. 6, JUNE 1993, for example.

The digital equalizer 2 for performing the waveform shaping (the waveform equalization) is disposed outside the clock extraction loop and is in a stage located after the A/D converter 1 and before the interpolator 3. The reference numeral 6 denotes a coefficient setting device for outputting the coefficients of the digital equalizer 2. The control circuit 5 generates the resample control signal 5a as already described, and also generates a coefficient setting control signal 5b based on the external signal and the frequency ratio information 4a from the timing recovery circuit 4 and outputs the coefficient setting control signal 5b to the coefficient setting device 6.

Figure 2:
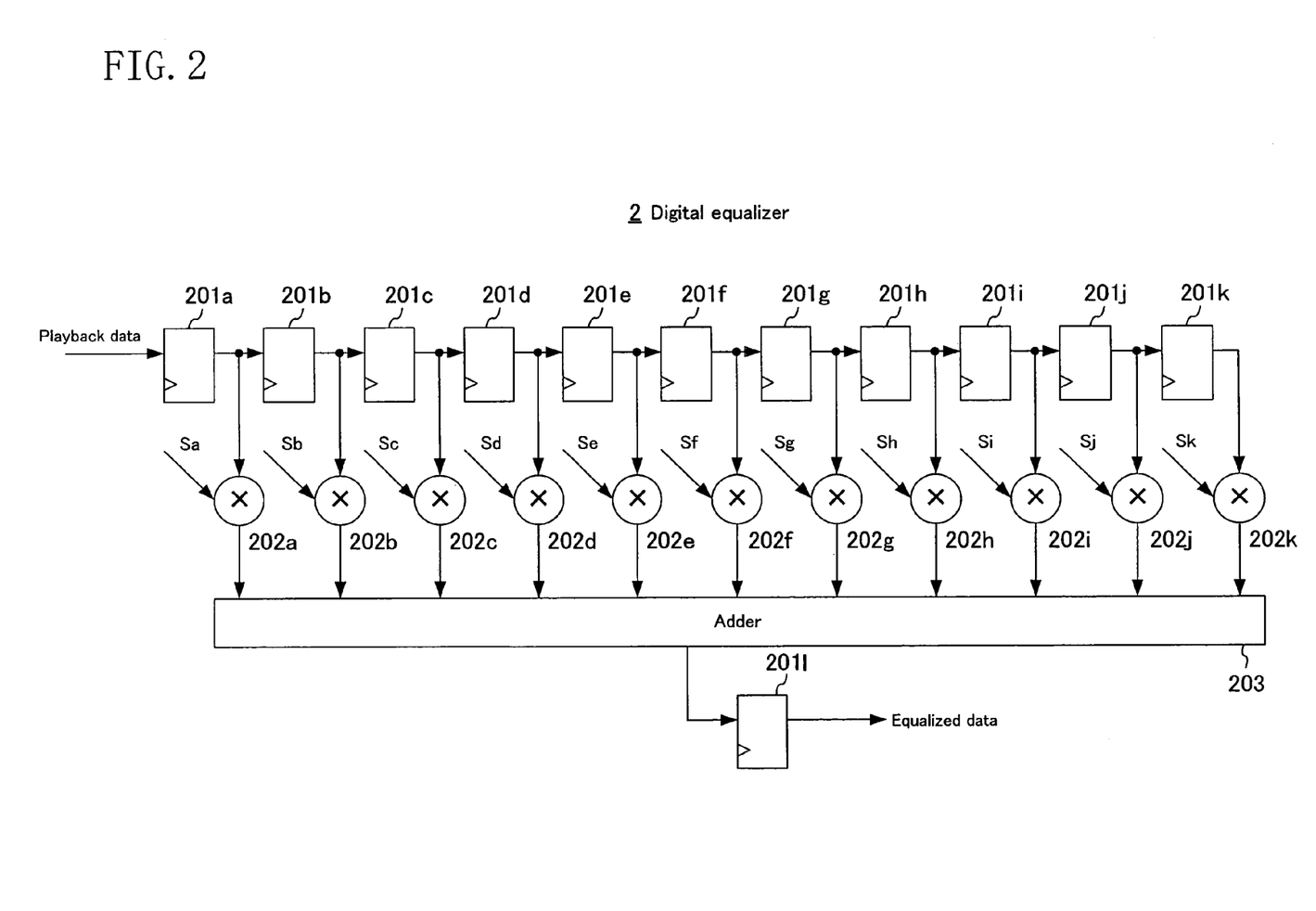
FIG. 2 is a view illustrating an exemplary internal structure of a digital equalizer included in the playback signal processing device.

FIG. 2 illustrates an exemplary internal structure of the digital equalizer 2. In FIG. 2, the reference numerals 201a to 201l indicate flip-flop circuits (delay circuits) which operate in accordance with the fixed clock CLK from the synthesizer 7 shown in FIG. 1. The flip-flop circuits 201a to 201k, except for the flip-flop circuit 201l, are connected in series, and the playback data from the A/D converter 1 is input into the flip-flop circuit 201a in the first stage. The reference numerals 202a to 202k denote multipliers, each of which multiplies delayed playback data from an associated one of the flip-flop circuits 201a to 201k by one of the coefficients Sa to Sk that corresponds to the delayed playback data. The coefficients Sa to Sk are the coefficients of the digital equalizer 2 output from the coefficient setting device 6 shown in FIG. 1. The reference numeral 203 refers to an adder for adding together all multiplication results from the eleven multipliers 202a to 202k. The addition result obtained by the adder 203 is output to the flip-flop circuit 201l, in which the addition result is delayed by one clock, and the output of the flip-flop circuit 201l is input to the interpolator 3 as the equalized playback data. In FIG. 2, the number of multiplies 202a to 202k is eleven, but is not limited to this.

Figure 3:
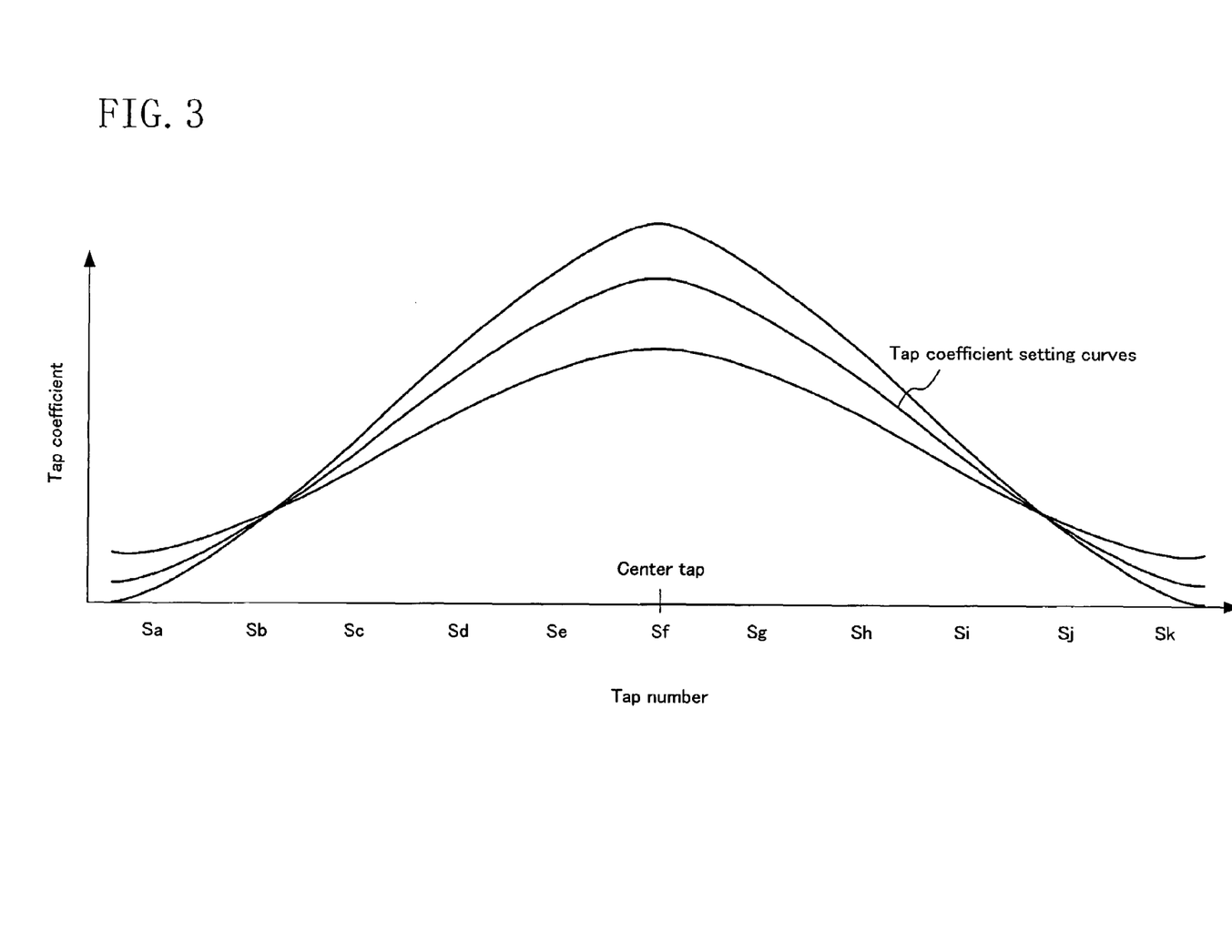
FIG. 3 is a view illustrating exemplary setting of the tap coefficients of the digital equalizer.

FIG. 3 illustrates exemplary setting of the values of the coefficients of the digital equalizer 2. In FIG. 3, the horizontal axis indicates tap numbers corresponding to the multipliers 202a to 202k, while the vertical axis represents the values of the tap coefficients Sa to Sk corresponding to the respective tap numbers. With reference to FIG. 3, an example of a method for setting these tap coefficients Sa to Sk will be described. The coefficient setting device 6 shown in FIG. 1 beforehand has three types of tap coefficient setting curves shown in FIG. 3 in accordance with the equalization level in the playback data. Each of these setting curves is a set of the values of the eleven tap coefficients Sa to Sk connected together to form the curve. These setting curves are not limited to the three types, but, in an actual coefficient setting device, four or more types of setting curves may be prepared. These tap coefficient setting curves are bilaterally-symmetric with the center tap being the center, so as to prevent group delay in the equalized data. Furthermore, in FIG. 3, the odd number of setting curves is shown, but practically an even number of setting curves does not cause any problems, so long as the setting curves are bilaterally-symmetric. The control circuit 5 outputs the coefficient setting control signal 5b according to the frequency ratio information 4a from the timing recovery circuit 4. In response to the coefficient setting control signal 5b, the coefficient setting device 6 selects an appropriate type of setting curve from among the three types of tap coefficient setting curves and outputs the set of coefficients Sa to Sk included in the selected setting curve to the digital equalizer 2. This allows the coefficients of the digital equalizer 2 to be set appropriately in accordance with the frequency ratio information 4a from the timing recovery circuit 4, which enables the playback data to be converted into appropriately equalized data. The coefficient setting device 6 may calculate and output the values of the tap coefficients Sa to Sk included in each set (i.e., each coefficient setting curve) on an as needed basis.

SECOND EMBODIMENT

Next, a playback signal processing device according to a second embodiment will be described.

In this embodiment, the tap coefficients of a digital equalizer 2 are changed. Specifically, in FIG. 3 which describes the first embodiment, the eleven tap coefficients Sa to Sk are set, but in this embodiment, the number of tap coefficients to be used is adjusted according to the speed at which data is played back from an optical disk or the like.

Figure 4:
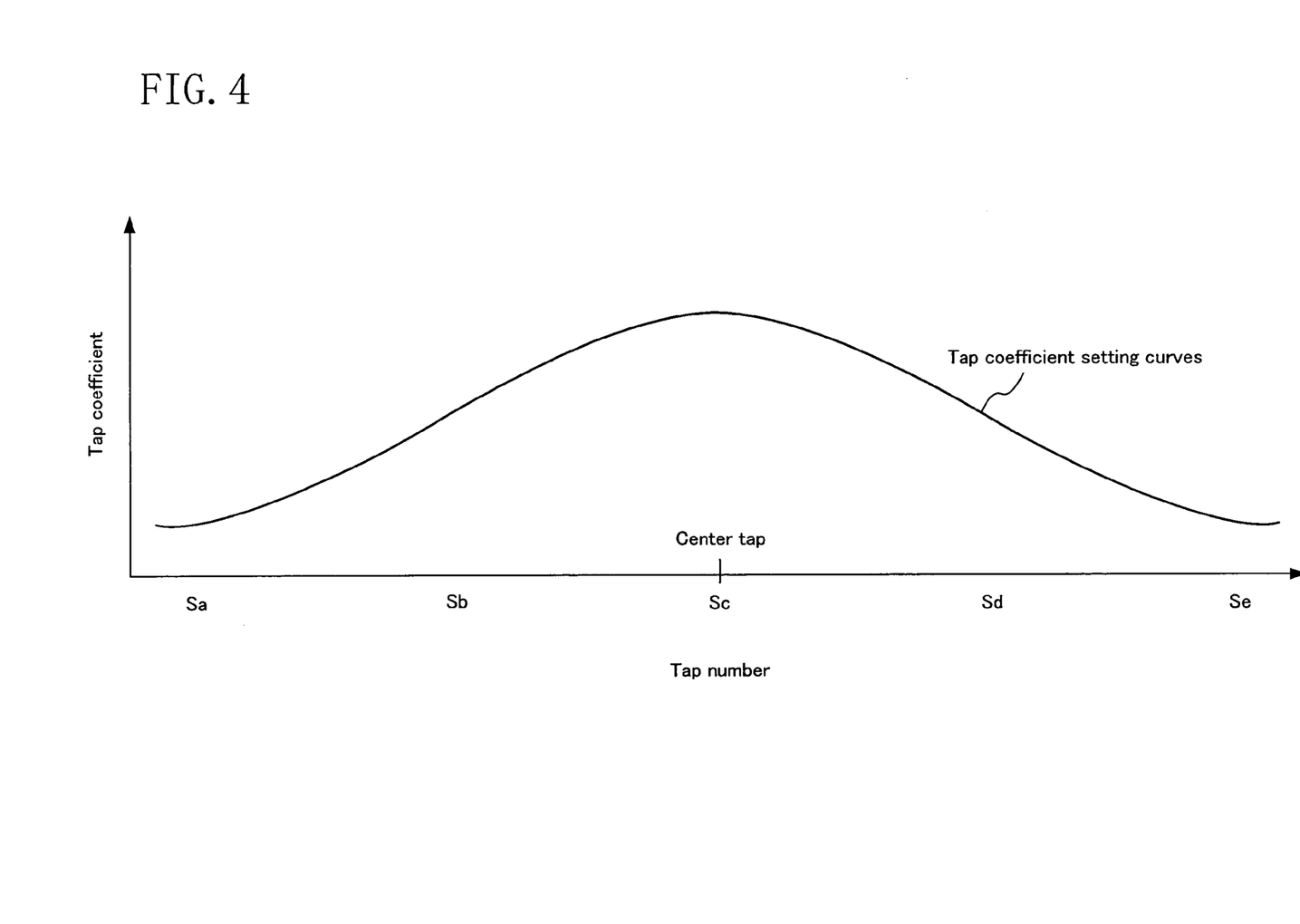
FIG. 4 is a view illustrating other exemplary setting of the tap coefficients of the digital equalizer.

More specifically, a tap coefficient setting method will be described with reference to FIG. 4. For example, in a case where five tap coefficients are necessary according to the speed at which data is played back from an optical disk or the like, tap coefficients Sa to Se may be used and adjusted so as to be included in a coefficient setting curve with the tap coefficient Sc being the center tap. In this way, it is possible to set the five tap coefficients Sa to Se. In this case, the remaining tap coefficients Sf to Sk are set to zero. Information on the speed at which data is played back from an optical disk or the like is input to a control circuit 5 as the external signal shown in FIG. 1. The control circuit 5 outputs, to a coefficient setting device 6, a coefficient setting control signal 5b corresponding to the playback speed information.

Accordingly, in this embodiment, the structure and tap coefficients of the digital equalizer 2 can be set variably according to the external information, whereby it is possible to convert playback data from an optical disk or the like into appropriately equalized data.

THIRD EMBODIMENT

Now, a playback signal processing device according to a third embodiment of the present invention will be described with reference to FIG. 1.

In this embodiment, the coefficients of a digital equalizer 2 are also set in accordance with information on whether data being played back from a recording medium, such as an optical disk, is located at the inner or outer rim of the recording medium.

Specifically, when data is played back from an optical disk or the like, frequency information contained in the analog playback signal varies depending on whether the playback data is located at the inner or outer rim of the disk. Therefore, in this embodiment, the tap coefficients of the digital equalizer 2 are changed so as to perform appropriate equalization processing. Information on whether data is located at the inner or outer rim is input into a control circuit 5 as the external signal shown in FIG. 1. Not only the information on whether data is located at the inner or outer rim, but also the fact that frequency information varies according to the playback position, for example, ZCLV in the case of DVDs, may be detected and input into the control circuit 5 as the external signal.

Accordingly, in this embodiment, the structure and coefficients of the digital equalizer 2 are set variably according to the external information, whereby it is possible to convert playback data into appropriately equalized data.

FOURTH EMBODIMENT

Next, a playback signal processing device according to a fourth embodiment of the present invention will be described with reference to FIG. 1.

In this embodiment, the coefficients of a digital equalizer 2 are set in accordance with a type-determination signal that determines the type of an optical disk or the like.

Specifically, in this embodiment, the tap coefficients of the digital equalizer 2 are changed in accordance with the type of the recording medium so as to perform appropriate equalization processing, because frequency information contained in an analog playback signal at the time of 1X playback differs between a CD and a DVD, for example. The information for determining the type of an optical disk or the like is input as an external signal to the control circuit 5 shown in FIG. 1.

Therefore, in this embodiment, it is also possible to convert playback data into appropriately equalized data by setting the structure and coefficients of the digital equalizer 2 variably in accordance with the external information.

FIFTH EMBODIMENT

Next, a playback signal processing device according to a fifth embodiment of the present invention will be described with reference to FIG. 1.

In this embodiment, the coefficients of a digital equalizer 2 are set using "X" speed information on the speed at which data is played back from an optical disk or the like. In the case of a DVD, playback may be performed at a speed of up to 16×. In view of this, the tap coefficients of the digital equalizer 2 are changed in accordance with the "X" speed information so as to perform appropriate equalization processing. The "X" speed information on the speed at which an optical disk or the like is played back is input as an external signal to the control circuit 5 shown in FIG. 1.

Therefore, in this embodiment, it is also possible to convert playback data into appropriately equalized data by setting the structure and coefficients of the digital equalizer 2 variably in accordance with the external information.

SIXTH EMBODIMENT

Next, a playback signal processing device according to a sixth embodiment of the present invention will be described with reference to FIG. 1.

In this embodiment, the coefficients of a digital equalizer 2 are set using a failure detection signal indicating detection of a failure in an analog playback signal. For example, the surfaces of optical disks and the like are subject to scratches and contamination by fingerprints, and when the surface is severely soiled, a playback signal may be harmed. In that case, the timing recovery circuit 4 may not be able to perform precise clock extraction. In order to address this, in this embodiment, the tap coefficients of a digital equalizer 2 are reset to zero, and equalization processing is performed again. This failure detection signal is input as an external signal to the control circuit 5 shown in FIG. 1.

Therefore, in this embodiment, it is also possible to convert playback data into appropriately equalized data by setting the structure and coefficients of the digital equalizer 2 variably in accordance with the external information.

SEVENTH EMBODIMENT

Lastly, a playback signal processing device according to a seventh embodiment of the present invention will be described with reference to FIG. 1.

In this embodiment, when the failure detection signal described in the sixth embodiment is input as an external signal to a control circuit 5, the control circuit 5 resets the tap coefficients of a digital equalizer 2 to zero, while at the same time the control circuit 5 retains a coefficient setting control signal 5b to a coefficient setting device 6 and a resample control signal 5a to an interpolator 3 so that the tap coefficients of the digital equalizer 2 that has operated stably until that time are stored. And when playback processing is performed again, the stored coefficient setting control signal 5b and resample control signal 5a are used so that the tap coefficients of the digital equalizer 2 immediately before the reset are used.

Therefore, in this embodiment, it is possible to update the coefficients quickly.

INDUSTRIAL APPLICABILITY

As described above, according to the present invention, the digital equalizer is allowed to perform waveform equalization in an excellent manner, while the digital equalizer is disposed outside the clock extraction loop between the interpolator and the timing recovery circuit. This permits the response speed of the timing recovery circuit to be enhanced further. The present invention is thus applicable, for example, to efficient playback signal processing devices with high clock extraction capability for playing back signals from recording media such optical disks.

The invention claimed is:

1. A playback signal processing device for receiving an analog playback signal and extracting, from the analog playback signal, binary digital data and a clock which is synchronized with the digital data, the playback signal processing device comprising:
   a synthesizer for outputting a fixed clock of a predetermined frequency;
   an A/D converter for receiving the analog playback signal and the fixed clock from the synthesizer, quantizing the analog playback signal in accordance with the timing of the fixed clock, and outputting digital playback data;
   a digital equalizer for receiving the playback data from the A/D converter and a plurality of coefficients and equalizing the playback data according to the plurality of coefficients in accordance with the timing of the fixed clock from the synthesizer;
   an interpolator for receiving the playback data equalized by the digital equalizer and a resample control signal and obtaining, from the equalized playback data, resampled data and a resampled clock that correspond to clock information contained in the equalized playback data;
   a timing recovery circuit for outputting frequency ratio information on a ratio between a frequency indicated by clock information contained in the analog playback signal and the frequency of the fixed clock output from the synthesizer, according to the resampled data and the resampled clock from the interpolator;
   a control circuit for receiving the frequency ratio information from the timing recovery circuit and an external signal, generating the resample control signal based on the received frequency ratio information and external signal to output the resample control signal to the interpolator, and generating a coefficient setting control signal based on the received frequency ratio information and external signal to output the coefficient setting control signal; and
   a coefficient setting device for receiving the coefficient setting control signal from the control circuit, generating the plurality of coefficients based on the coefficient setting control signal, and outputting the plurality of coefficients to the digital equalizer.

2. The playback signal processing device of claim 1, wherein the digital equalizer includes a plurality of delay circuits, a plurality of multipliers, and an adder.

3. The playback signal processing device of claim 2, wherein, of the plurality of delay circuits and the plurality of multipliers included in the digital equalizer, the number of delay circuits to be used and the number of multipliers to be used are variable as desired.

4. The playback signal processing device of claim 3, wherein, in the digital equalizer, the number of delay circuits to be used and the number of multipliers to be used are varied according to the frequency ratio information from the timing recovery circuit.

5. The playback signal processing device of claim 1, wherein the fixed clock output from the synthesizer has a frequency higher than the frequency indicated by the clock information contained in the analog playback signal.

6. The playback signal processing device of claim 1, wherein the coefficient setting device beforehand has a plurality of sets of coefficients for the digital equalizer, selects the coefficients in one of the sets that corresponds to the coefficient setting control signal from the control circuit, and outputs the selected coefficients to the digital equalizer.

7. The playback signal processing device of claim 2, wherein, in the coefficient setting device, coefficients for shaping the waveform of the playback data from the A/D converter are set beforehand, and the coefficient setting device selects a required number of multipliers from among the included multipliers in accordance with the coefficient setting control signal from the control circuit and calculates and outputs a plurality of coefficients for the selected multipliers.

8. The playback signal processing device of any one of claims 1 to 7, wherein the analog playback signal is a signal played back from a recording medium such as an optical disk.

9. The playback signal processing device of claim 8, wherein the external signal input to the control circuit is information on whether data being played back from the recording medium is located at the inner or outer rim of the recording medium.

10. The playback signal processing device of claim 8, wherein the external signal input to the control circuit is information on a speed at which the recording medium is played back.

11. The playback signal processing device of claim 8, wherein the external signal input to the control circuit is a type-determination signal that determines the type of the recording medium.

12. The playback signal processing device of claim 1, wherein the external signal input to the control circuit is a failure detection signal which indicates detection of a failure in the analog playback signal.

13. The playback signal processing device of claim 12, wherein the control circuit retains the value of the resample control signal output to the interpolator and the value of the coefficient setting control signal output to the coefficient setting device in a stable state, and when the failure detection signal is input as the external signal, the control circuit temporarily resets those control signals, and when the input of the failure detection signal is stopped, the control circuit outputs again the resample control signal and the coefficient setting control signal having the retained values.

* * * * *